Patented Sept. 12, 1939

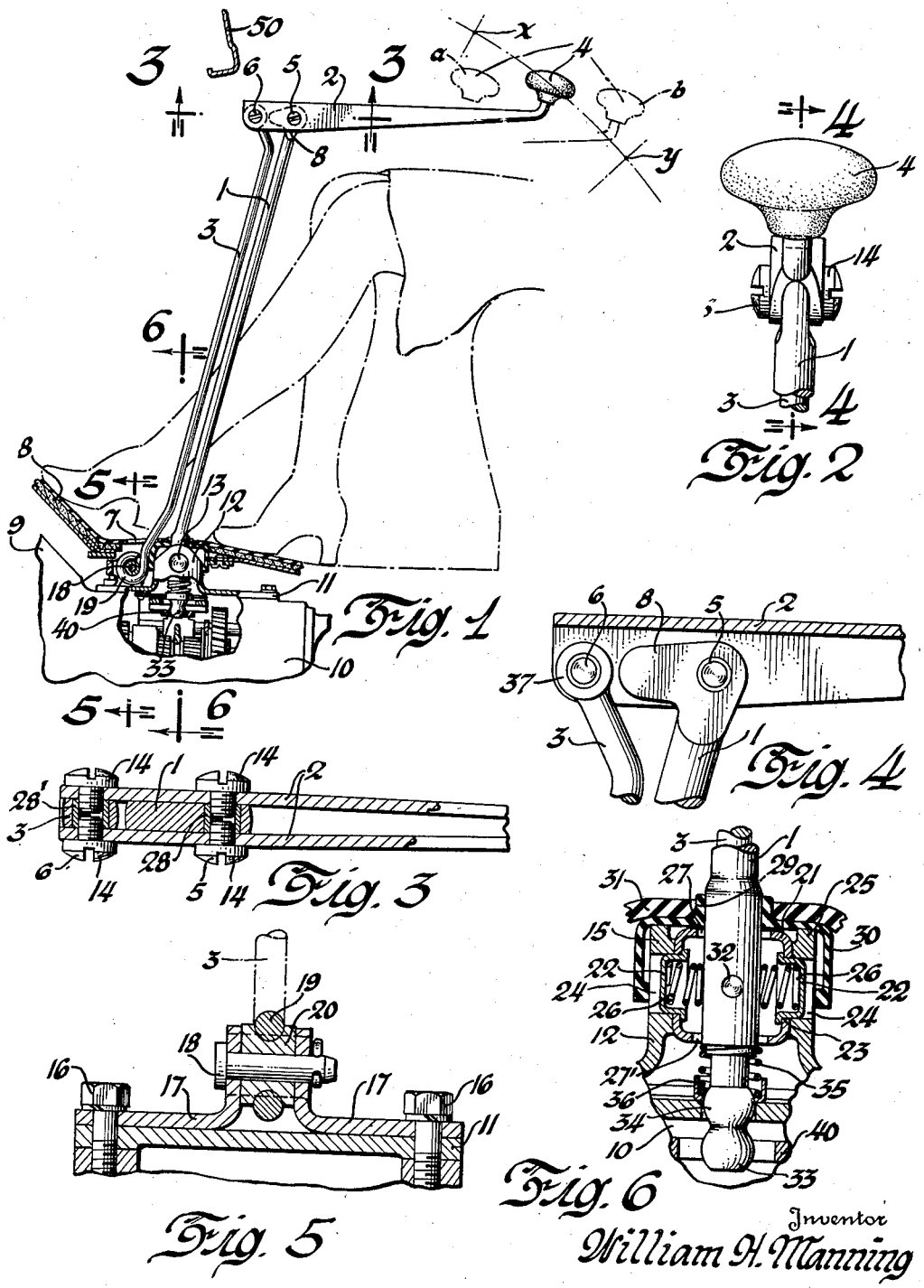

2,172,663

UNITED STATES PATENT OFFICE 2,172,663

EXTENSION GEAR LEVER

William H. Manning, Birmingham, Mich., assignor to General Motors Corporation, Detroit, Mich., a corporation of Delaware Application March 3, 1937, Serial No. 128,836

12 Claims. (Cl. 74—473)

This invention relates to gear shifting mechanism and has special utility as a part of the transmission gearing of automobiles, rail cars, and other similar vehicles in which an extension of a ratio shift control is needed. The invention has as a principal object the provision of a gear shifting mechanism characterized by its simplicity of construction and operation, which has enhanced value mechanically and commercially in that it provides a clear floor space in the driving compartment of a vehicle, at the same time affording a comfortable, and flexible control for the manipulation of the various gear shifts.

Present day motor vehicles as now equipped with torque conversion means such as variable speed transmissions placed between the power plant and the final drive, have such relative spacing of these members that the projecting controls commonly interfere with free access of either driver or passenger from or across the seating in the front compartment. Control levers project through the floorboard to restrict free access, and are therefore undesirable.

My invention has to do with the establishing of the means of control as outlined above through a novel construction of the control mechanism obtained in particular by simplicity and the minimum movement of parts utilized. A particular novelty in my invention consists in a linkage of quadrilateral or parallelogram form, providing approximate planar shift for the various positions of the hand lever, the assembly requiring a small number of simple parts. A further advantage lies in the unique means by which my device eliminates undesirable vibrations of the shifter control mechanism within itself, without requiring external damping or restraining means affixed to dash or cowling.

My device may also be economically and readily manufactured and assembled, and is of durable nature.

My invention will be made apparent in the following description and annexed drawing, in which other objects and advantages are apparent.

Figure 1 is an elevation view of the driving compartment of a motor vehicle, with the gearlever connections to the transmission unit shown partly in section.

Figure 2 shows in elevation the parts of the gearshifter hand control mechanism as seen from the right of Figure 1.

Figures 3 and 4 respectively are horizontal sections and elevation views of the mechanism at the upper part of the shifter control of Figure 1.

Figure 5 is a vertical section taken at 5—5 of Figure 1, describing the related parts of the jointed shifter head for the transmission unit of Figure 1 in enlarged detail.

Figure 6 is a transverse vertical section at 6—6 of Figure 1 showing the arrangement of shift control levers and associated parts which effect the actual change of speed ratio within the gearbox of Figure 1.

It is deemed unnecessary to show full detail of the gearshift mechanism; the shifter head mechanism of my device resembling that described in U. S. 1,886,484 Tenney filed Oct. 19, 1931, issued Nov. 8, 1932; U. S. 1,886,849 Tenney and Le Gros, filed Nov. 2, 1931, issued Nov. 8, 1932; and U. S. S. N. 91,073 Tenney, filed July 17, 1936, for Power transmission control mechanism.

Referring now to the drawing, Fig. 1 shows the driver's compartment of the passenger car of present day design in which two or more persons may be seated; the gear shift lever ball or handle 4 is mounted on a relatively heavy extension bar 2 pivoted at point 5 to the main gear shift lever 1. Parallel bar 3 is pivoted to extension bar as shown at point 6 and passes downward parallel to the main gear shift lever 1, through aperture 7 in the floorboard 8.

In Figure 2 the precedingly mounted parts are shown in vertical elevation. The main clutch housing 9 is attached to transmission casing 10, the latter supporting bolted plate 11. Plate 11 is cast with mounting flanks 12 drilled through at pivot 13 to support the crosshead by which gear lever 1 may pivot fore and aft. Clamped under the boltheads 16 of plate 11 is pivoted fitting 17 having transverse pivot 18 for the support of the lower end of parallel bar 3, which is turned to form an eye at 19, embracing pivot piece 20, which may be of rubber or similar plastic.

When the gear lever assembly is in the solid outline position of Fig. 1, the transmission gearing is in neutral position, as will be described later. When it is in the forward-most position as shown in dashed outline a the transmission gearing may be in either reverse or second speed; and when it is in the rearmost position b likewise indicated in dashed line, the gearing may be in either low or direct drive positions.

Fig. 4 is a section on line 4—4 of Fig. 2, and shows the pivotal mountings of parallel bar 3 and lever 1 on the fitting 2.

As shown in Figures 3 and 4, extension bar 2 is of channel form, the upper end 8 of lever 1 being shaped to fit between the flanks of the bar 2 as shown. Tap screws 14 in tapped pivot points 5—6 in the flanks, serve as pivot supports for bushings 28 and 28', supporting lever 1 and the terminal eye 37 of rod 3 on the tap screws 14.

Fig. 6 shows the gear shift lever assembly as seen from the driver's seat looking forward. It is taken at right angles to the view of Fig. 1. The crosshead 15 mounted above is composed of a shell 21 punched out to the diameter of the pivot for gear lever 1, transversely to the fore and aft motion of the gear lever 1. Flanged caps 22 fit into the punching holes 23 and the pivot apertures 24 of flanks 25 retained by compression springs 26. Shell 21 is drilled out vertically at 27—27' to permit lost motion movement of the gear lever 1.

Sealing member 30 moves with the gear lever to seal aperture 29 in the rubber mat 31 covering the floorboards. Locating pin 32 fitting into drilled hole at the transverse centerline intersects slots (not shown) in shell 21. The lower or actuating end of gear lever 1 is formed with cam swells 33 and 34, above which anti-rattler spring 35 and retainer 36 are mounted. The cam swells intersect the shifter plate 40 in the customary manner as described in the precedingly noted patents and applications. It is not believed necessary to show a second section of the elements of Fig. 6 in that the structure is well described in the patents listed preceding.

The lateral movement of the gear lever will cause a portion of its longitudinal surface to intersect the inner face of aperture 27 with a lateral yielding of springs 26 opposite to the direction of the applied force. This causes the lower end of the lever 1 including the cam swells 33—34 to rock oppositely and laterally, thereby moving the shifter plate 40 in the normal manner.

When the gear lever is moved to the left as in Fig. 2, and simultaneously the right as in Fig. 1, the transmission mechanism including the shifter plate 40 shifts the gearing to low speed position. When the latter is moved from the neutral position to the left as in Fig. 1 and forward as in Fig. 2, the gearing is placed in reverse driving position. For second speed the lever 1 is moved to the right as in Fig. 2 and forward as in Fig. 1, and to the right as in Fig. 2 and toward the rear as in Fig. 1 for direct drive. This H-form of shift pattern is at present a standard for present day motor car production in the United States.

Because of the approximate straight line motion available to the use of the quadrilateral or parallelogram formed by pivots 5 and 6 with extension bar 2, lever 1 and rod 3, with pivots 13 and 18, including the arm established through the fixed positioning of pivots 5 and 6 to each other, a minimum of change in elevation of gear lever handle 4 is achieved, for all driving positions, without the necessity of affixing any portion of the shifter system to the cowling or to the instrument panel.

Restraining of gear shift motion by external slots, forks, or similar means, has been found to possess certain commercial disadvantages, among which are jamming of the controls caused by weaving of the body structure, and excessive vibration due to the elastic mounting of the power plant and drive mechanism. These are avoided by my structure, which moves with the power plant.

My invention overcomes these handicaps by being entirely detached from the body of the vehicle and relying for its support entirely on the mounting of the drive mechanism. A particular advantage lies in the mass of members 1, 2, 3, and 4, which is of such an order that vibration of the rods 1 and 3 from pivots 13 and 18 about the centerline of the powerplant, with periodic frequency impulses of the rubber mounted power plant assembly is negligible. The first reason for this is the selection of a shifter assembly mass value having a natural oscillation period of a frequency beyond or below the normal frequency range of the power plant; the harmonic values at which maximum energy transfer might occur being far removed from the natual period of the control assembly. Further, the permitted lost motion in the mounting of gearlever 1 in shell 21 and by springs 26 at the shifter head, and the additional loose coupling at pivots 5 and 6 provides damping effects tending to further diminish the natural period of the masses of the control lever assembly.

The space advantage gained by my invention is illustrated by points X and Y of Figure 1, which represent the compared requirement for the common form of unitary gearlever pivoted at 13, the arc of movement (shown in dashed line) for required shift intersecting the instrument panel 50, whereas my device moves in a plane so as to clear the panel.

In common gear shifter devices, the mass of the shifter ball with connected parts, and the ordinary net length of the leverage system between the mean center of mass of the unsupported and undamped hand lever system is such that for torque vibrations of powerplant and connected gearbox assembly within the engine speed ranges adjacent to and at normal idle, an unpleasant vibration oscillation of the gearlever takes place. These are relatively low frequency impulses compared to the number of engine power strokes. In my device this does not occur in that the added masses of the members 2 and 3 in the overall combination yield a natural period of frequency considerably slower than the experienced vibration rates with present day power plant equipment at idling and low engine speeds. Furthermore, I have disposed portions of the added masses in both the longitudinal and transverse planes, to absorb energy of both rocking and axial moment. The adoption of my system has resulted in a considerably improved comfort factor to the car driver, gained without the use of auxiliary shifter coupling mechanism, special external damping means or extra motion restraining mechanism for the gearlever.

It is believed within the scope of my invention to select gear lever assembly control masses of such dimension for a given set of powerplant vibration conditions, that the net natural frequency is removed from the resonance range over the scale of engine operating speeds, and is only subject to frictional harmonics thereof for vibration in resonance. It is known in the art of harmonic balancing to select counteracting masses in static and dynamic relationship to applied impulses, but my invention herewith is believed to constitute an unique contribution to the art of controls for powerplant members wherein resonance vibration of operator-operated controls is eliminated, or made negligible.

I claim:

1. In the art of controls for change speed gearing, in combination, a powerplant including a change speed gearbox movable according to varying torque impulses at lower frequencies than the powerplant impulse frequencies, shift control apparatus for said gearbox mounted on and movable therewith, and means embodied in said apparatus inherent in its shifter linkage effective to absorb energy derived from said low frequency impulses within predetermined low speed ranges of said powerplant.

2. In gearlever construction, in combination, a pivoted parallelogram linkage mounted on a gearbox having a fixed distance between two longitudinal pivot points, and embodying an operator-operable member movable in a plane intersecting said pivot points, in approximate straight line motion thereto; said member including two pivots of approximately equal distance apart to said first named pivot points and said member moving bodily and longitudinally for shifting the gearing of said gearbox to and from driving positions.

3. In control devices for change speed gearing, in combination, a gear casing, ratio shifting mechanism supported thereby embodying a pivoted mass member, a mass supplementary to said member and associated with an operator-operable element arranged to move said member supported thereon, and having a predetermined additional mass characteristic due to said supplementary mass, and lost motion connections intermediate said casing and said element effective to dampen vibrations transmitted from said casing according to the predetermined mass and distance characteristics of said member, said supplementary mass, and said element.

4. In combination, a motor vehicle embodying a powerplant assembly including a gearbox capable of longitudinal and transverse oscillatory motion, attached to the vehicle framing between which and said gearbox said motion takes place, operator-operable control members projecting into a compartment of said vehicle framing, constituting change speed control mechanism for said gearbox and forming a parallelogram linkage mounted on said gearbox and connected to said control members arranged to restrain the longitudinal motion of said members in planes intersecting the centerline of said gearbox.

5. A gearshifting structure having in combination, four pivots including therebetween three parallelogram links and a fourth side constituted by the casing on which two of said pivots are mounted, the link opposite said fourth side being adapted to be operator-operated bodily in translation motion, and one of which is arranged to convert the motion of said first named link into selective gear engagement motion.

6. In variable speed transmission controls, in combination, a change speed control mechanism embodying parallel links, pivots supporting said links, said mechanism including a bodily movable operator-operated control member restrained by said pivots to rock said links in planes approximately intersecting the longitudinal axis of said gearbox, likewise restrained to move certain of said pivots in a plane parallel to a line joining the remainder of said pivots.

7. In power plant assemblies including change speed gearing, in combination, a gearbox casing capable of limited rotational vibration, a change speed gearlever flexibly pivoted on said casing so as to move laterally and longitudinally thereto, a shifter knob, a hand control member attached to said knob, movable with said gearlever arranged to move bodily in lateral and longitudinal planes, the mass of said member being adapted to weight the assembly of said gearlever, said member and said knob with respect to said flexible pivoting, and a lost motion connection between said gearlever and said member effective to dampen the effect of oscillations of said casing upon the motion of said member in the rotational direction.

8. In controls for motor vehicles, in combination, variable speed gearing housed in a gearbox casing, gear changing mechanism therefor embodying one pivot attached to said casing, a second pivot loosely supported by said casing, parallel arms extending from said pivots and pivoted each to a third arm arranged to move in the plane of said parallel arms, and operator-operated means included in the structure of said third arm whereby motion thereof in and transverse to said plane is effective to shift the gears of said gearing to separate speed ratio positions.

9. In a construction embodying a change-speed gearbox mounted for limited periodic translatory and rotational movement, a parallelogram linkage comprising two long links and two short links, the pivots for one of said short links being supported on said gear box, the structure of the casing, between the said pivots comprising the said short link the pivots for the other of said short links supporting it for free translatory motion longitudinally and laterally supported by the said long links from the first named pivots, and predetermined masses embodied in at least one of said long links and the second of said short links whereby the transmitted movements of said gearbox to said linkage are dampened within a given range of periodicity of said movements.

10. In motor vehicles, a change-speed gearbox, a quadrilateral linkage one member of which constitutes the shifter element for the gears of said gearbox, a second member of which is pivoted on the gearbox, and a third member movable bodily but pivotally with respect to said first two named members and constituting the operator-operated selector link having planar motion longitudinally and laterally for the various gear selecting motions.

11. In controls for a vehicle powerplant mounted for relative translatory and rocking motion, a change-speed gearbox connected to move with said powerplant, and a shifter control assembly mounted thereon for rocking and translatory motion and arranged to shift the gear ratio of said gearbox comprising a plurality of pivoted link elements, the mass of certain elements of said shifter control assembly being predetermined for resonance of the said assembly with the periodic pulsations of said powerplant for a given low range of vibration frequency thereof only.

12. In motor car construction, in combination, a motor vehicle, a powerplant for said vehicle comprising an engine and connected variable speed transmission mounted together in said vehicle for predetermined rocking and translatory yielding to the periodic torque impulses of said powerplant, a speed ratio control assembly supported on said transmission comprising a plurality of elements pivoted together and having limited rocking and translatory movement in order to occupy various speed ratio determining positions, damping means adapted to absorb oscillatory energy impulses between said powerplant and said assembly over a given range of impulse frequencies, and masses incorporated in certain of said elements for providing non-resonance between said assembly and said powerplant over a given frequency range of said periodic torque impulses.

WILLIAM H. MANNING.